US010199720B2

(12) United States Patent
Yang et al.

(10) Patent No.: US 10,199,720 B2
(45) Date of Patent: Feb. 5, 2019

(54) NETWORK ALLOCATION VECTOR OPERATIONS TO REDUCE CHANNEL ACCESS DELAY (71) Applicant: Intel IP Corporation, Santa Clara, CA (US)

(72) Inventors: Ou Yang, Santa Clara, CA (US); Chittabrata Ghosh, Fremont, CA (US); Carlos Cordeiro, Portland, OR (US); Solomon B. Trainin, Haifa (IL)

(73) Assignee: Intel IP Corporation, Santa Clara, CA (US)

( * ) Notice: Subject to any disclaimer, the term of this patent is extended or adjusted under 35 U.S.C. 154(b) by 204 days.

(21) Appl. No.: 15/278,449

(22) Filed: Sep. 28, 2016

(65) Prior Publication Data

US 2017/0302510 A1 Oct. 19, 2017

Related U.S. Application Data (60) Provisional application No. 62/324,001, filed on Apr. 18, 2016.

(51) Int. Cl.
H04W 84/12 (2009.01)
H01Q 1/24 (2006.01)
(Continued)

(52) U.S. Cl.
CPC ............... *H01Q 1/243* (2013.01); *H04B 7/04* (2013.01); *H04W 72/085* (2013.01)

(58) Field of Classification Search
CPC ............. H04W 84/12; H04W 74/0816; H04W 74/0808; H04W 72/085; H04W 24/10
See application file for complete search history.

(56) References Cited

U.S. PATENT DOCUMENTS

2010/0054213 A1* 3/2010 Trainin ................. H04W 28/26
370/336
2011/0103352 A1* 5/2011 Wentink .............. H04W 74/008
370/336
(Continued)

FOREIGN PATENT DOCUMENTS

WO WO-2015069090 A1 5/2015
WO WO-2015167290 A1 11/2015
WO WO-2017184273 A1 10/2017

OTHER PUBLICATIONS

"International Application Serial No. PCT/US2017/022524, International Search Report dated Jun. 27, 2017", 3 pp.

(Continued)

Primary Examiner — Charles C Jiang
Assistant Examiner — Will W Lin
(74) Attorney, Agent, or Firm — Schwegman Lundberg & Woessner, P.A.

(57) ABSTRACT

Computing readable media, apparatuses, and methods for network allocation vector operations to reduce channel access delay. An apparatus of a wireless device is disclosed. The apparatus comprising processing circuitry configure to: select a first one or more directional multi-gigabit (DMG) antennas from DMG antennas of the wireless device. The processing circuitry further configured to configure the wireless device to perform a clear channel assessment (CCA) for each of a plurality of CCA configurations applicable to the first one or more DMG antennas, where each CCA configuration comprises a second one or more of the DMG antennas. The processing circuitry further configured to if each CCA configuration applicable to the first one or more DMG antennas indicate the channel is idle, decrease a backoff time, and, if the backoff time is zero, configure the (Continued)

wireless device to transmit a packet on the channel using the first one or more DMG antennas.

20 Claims, 8 Drawing Sheets (51) Int. Cl.
    *H04W 72/08*     (2009.01)
    *H04B 7/04*     (2017.01)
    *H04W 16/28*     (2009.01)

(56) References Cited

U.S. PATENT DOCUMENTS

| | | | | |
|---|---|---|---|---|
| 2013/0012254 | A1* | 1/2013 | Venkatachari | H04W 52/12 455/522 |
| 2015/0078356 | A1* | 3/2015 | Kwon | H04W 74/0816 370/338 |
| 2015/0139083 | A1* | 5/2015 | Kneckt | H04W 74/0816 370/329 |
| 2015/0327297 | A1* | 11/2015 | Nilsson | H04W 72/1215 370/336 |
| 2016/0081010 | A1* | 3/2016 | Seok | H04W 74/0816 370/329 |
| 2016/0255660 | A1* | 9/2016 | Son | H04B 7/0491 370/329 |
| 2017/0118656 | A1* | 4/2017 | Xin | H04W 16/28 |
| 2017/0303314 | A1* | 10/2017 | Cariou | H04L 43/16 |
| 2018/0063788 | A1* | 3/2018 | Yang | H04W 12/10 |
| 2018/0139801 | A1* | 5/2018 | Kwon | H04W 84/12 |

OTHER PUBLICATIONS

"International Application Serial No. PCT/US2017/022524, Written Opinion dated Jun. 27, 2017", 8 pp.

Carlos, Cordeiro, "Specification FrameworkforTGay", IEEE 802. 11-15/01358r3, (Mar. 21, 2016), 1-8.

Sai, Shankar N, et al., "WiGig and IEEE 802.11 ad—Formulti-gigabyte-per-second WPAN and WLA", arXiv.org, [Online] Retrieved from the Internet : <https://arxiv.org/abs/1211.7356>, (Nov. 30, 2012), 1-24.

* cited by examiner

502.1
NAV TABLE

| # OF NAV | NAV TIMER | NAV SRC | NAV DST | RTS_ CANCEL- LABLE | DTS_ CANCEL- LABLE |
|---|---|---|---|---|---|
| 1 | 500 us | EDMG STA2 | EDMG STA3 | Y | Y |
| 2 | 1 ms | EDMG STA4 | EDMG STA5 | Y | Y |

502.2
NAV TABLE

| # OF NAV | NAV TIMER | NAV SRC | NAV DST | RTS_ CANCEL- LABLE | DTS_ CANCEL- LABLE |
|---|---|---|---|---|---|
| 1 | 1 ms | EDMG STA4 | EDMG STA5 | Y | Y |

502.3
NAV TABLE

| # OF NAV | NAV TIMER | NAV SRC | NAV DST | RTS_ CANCEL- LABLE | DTS_ CANCEL- LABLE |
|---|---|---|---|---|---|
| 1 | 700 us | EDMG STA6 | EDMG STA7 | Y | Y |

ONE-NAV TABLE

| NAV TIMER | RTS_ CANCEL- LABLE | DTS_ CANCEL- LABLE |
|---|---|---|
|  |  |  |

604

MULTI-NAV TABLE

| # OF NAV | NAV TIMER | NAV SRC | NAV DST | RTS_ CANCEL- LABLE | DTS_ CANCEL- LABLE |
|---|---|---|---|---|---|
|  |  |  |  |  |  |
|  |  |  |  |  |  |

NETWORK ALLOCATION VECTOR OPERATIONS TO REDUCE CHANNEL ACCESS DELAY

PRIORITY CLAIM

This application claims the benefit of priority under 35 USC 119(e) to U.S. Provisional Patent Application Ser. No. 62/324,001, filed Apr. 18, 2016, which is incorporated herein by reference in its entirety.

TECHNICAL FIELD

Embodiments pertain to wireless networks and wireless communications. Some embodiments relate to wireless local area networks (WLANs) and Wi-Fi networks including networks operating in accordance with the Institute of Electrical and Electronic Engineers (IEEE) 802.11 family of standards. Some embodiments relate to IEEE 802.11ay. Some embodiments relate to methods, computer readable media, and apparatus for network allocation vector (NAV) operations to reduce channel access delay.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
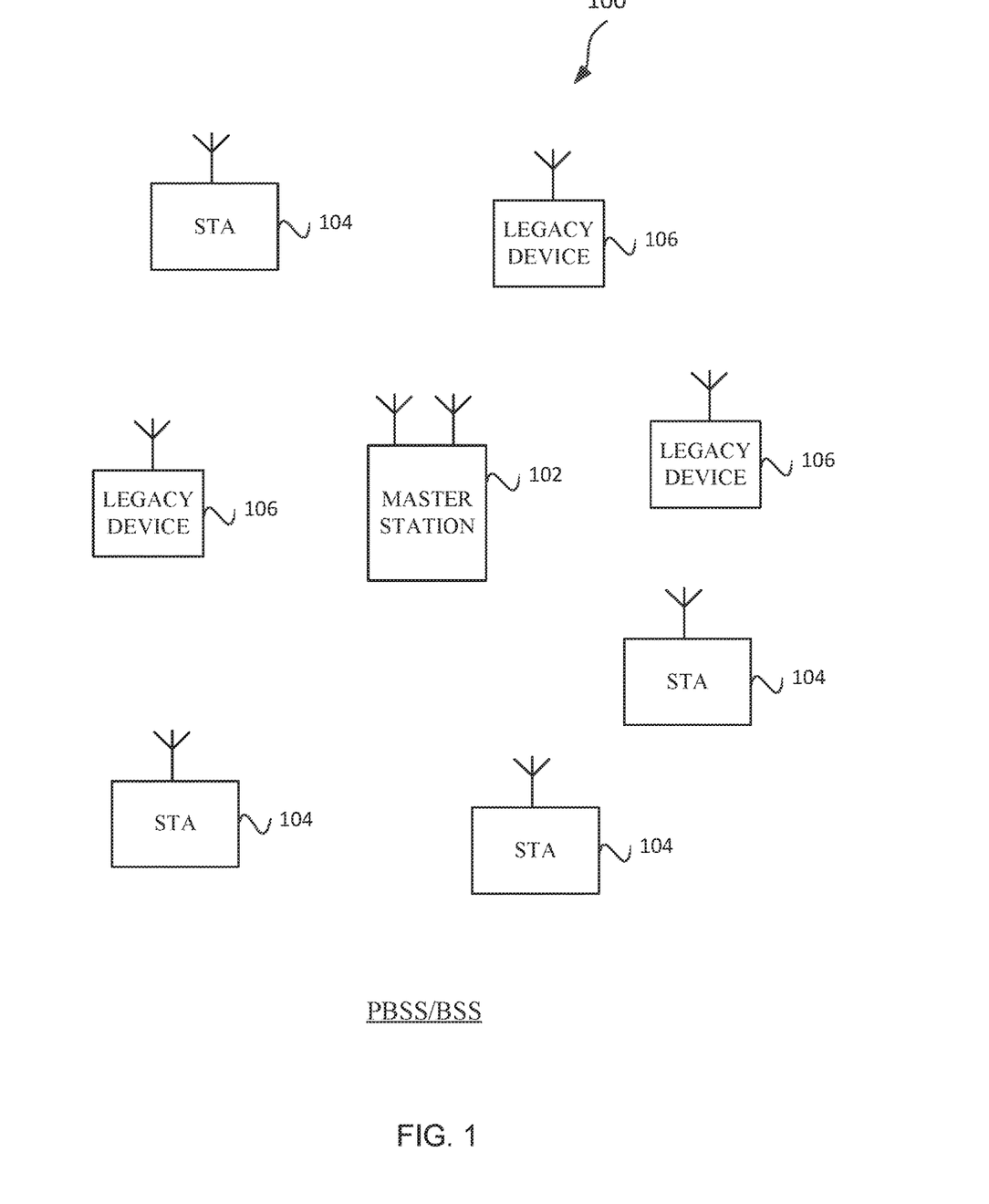
FIG. 1 illustrates a WLAN in accordance with some embodiments.

FIG. 1 illustrates a WLAN 100 in accordance with some embodiments. The WLAN may comprise a basis service set (BSS) or personal BSS (PBSS) 100 that may include a master station 102, which may be an AP or PBSS control point (PCP), a plurality of wireless (e.g., IEEE 802.11ay) STAs 104 and a plurality of legacy (e.g., IEEE 802.11n/ac/ad) devices 106.

The master station 102 may be an AP configured to transmit and receive in accordance with one or more IEEE 802.11 communication protocols, IEEE 802.11ax or IEEE 802.11ay. In some embodiments, the master station 102 is a base station. The master station 102 may be part of a PBSS. The master station 102 may use other communications protocols as well as the IEEE 802.11 protocol. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include code division multiple access (CDMA), space-division multiple access (SDMA), multiple-input multiple-output (MIN)), multi-user (MU) MIMO (MU-MIMO), and/or single-input single-output (SISO). The master station 102 and/or wireless STA 104 may be configured to operate in accordance with Next Generation 60 (NG60), WiFi Gigabyte (WiGiG), and/or IEEE 802.11ay.

The legacy devices 106 may operate in accordance with one or more of IEEE 802.11 a/b/g/n/ac/ad/af/ah/aj, or another legacy wireless communication standard. The legacy devices 106 may be STAs or IEEE 802 STAs. The wireless STAs 104 may be wireless transmit and receive devices such as cellular telephone, smart telephone, hand-held wireless device, wireless glasses, wireless watch, wireless personal device, tablet, or another device that may be transmitting and receiving using the IEEE 802.11 protocol such as IEEE 802.11ay or another wireless protocol. In some embodiments, the wireless STAs 104 may operate in accordance with IEEE 802.11ax. The STAs 104 and/or master station 102 may be attached to a BSS and may also operate in accordance with IEEE 802.11ay where one of the STAs 104 and/or master station 102 takes the role of the Priority Control Point (PCP).

The master station 102 may communicate with legacy devices 106 in accordance with legacy IEEE 802.11 communication techniques. In example embodiments, the master station 102 may also be configured to communicate with wireless STAs 104 in accordance with legacy IEEE 802.11 communication techniques. The master station 102 may use techniques of 802.11ad for communication with legacy device. The master station 102 and/or STA 104 may be a personal basic service set (PBSS) Control Point (PCP) which can be equipped with large aperture antenna array or Modular Antenna Array (MAA).

The master station 102 and/or STA 104 may be equipped with more than one antenna. Each of the antennas of master station 102 or STA 104 may be a phased array antenna with many elements. In some embodiments, an IEEE 802.11ay frame may be configurable to have the same bandwidth as a channel. In some embodiments, the master station 102 and/or STA 104 may be equipped with one or more directional multi-gigabyte (DMG) antennas, which may include multiple radio-frequency base band (RF-BB) chains. The master station 102 and/or STA 104 may be configured to perform beamforming and may have an antenna weight vector associated with one or more antennas. In some embodiments, the master station 102 and/or STA 104 may be a DMG master station 102 or DMG STA 104, respectively. In some embodiments, the master station 102 and/or STA 104 may be an enhanced DMG (EDMG) master station 102 or EDMG STA 104, respectively. In some embodiments, the master station 102 and/or STA 104 may transmit a frame, e.g., physical layer convergence protocol (PLCP) protocol data unit (PPDU)).

An IEEE 802.11ay frame may be configured for transmitting a number of spatial streams, which may be in accordance with MU-MIMO. In other embodiments, the master station 102, wireless STA 104, and/or legacy device 106 may also implement different technologies such as code division multiple access (CDMA) 2000, CDMA 2000 1X, CDMA 2000 Evolution-Data Optimized (EV-DO), Interim Standard 2000 (IS-2000), Interim Standard 95 (IS-95), Interim Standard 856 (IS-856), Long Term Evolution (LIE), Global System for Mobile communications (GSM), Enhanced. Data rates for GSM Evolution (EDGE), GSM EDGE (GERAN), IEEE 802.16 (i.e., Worldwide Interoperability for Microwave Access (WiMAX)), BlueTooth®, or other technologies.

In accordance with some IEEE 802.11ay embodiments, a master station 102 may operate as a master station which may be arranged to contend for a wireless medium (e.g., during a contention period) to receive exclusive control of the medium, which may be termed a transmission opportunity (TxOP) for performing beamforming training for a multiple access technique such as OFDMA or MU-MIMO. In some embodiments, the multiple-access technique used during a TxOP may be a scheduled OFDMA technique, although this is not a requirement. In some embodiments, the multiple access technique may be a space-division multiple access (SDMA) technique.

The master station 102 may communicate with legacy stations 106 and/or wireless stations 104 in accordance with legacy IEEE 802.11 communication techniques.

In example embodiments, the STA 104 and/or the maker station 102 are configured to perform the methods and operations herein described in conjunction with FIGS. 1-9.

Figure 2:
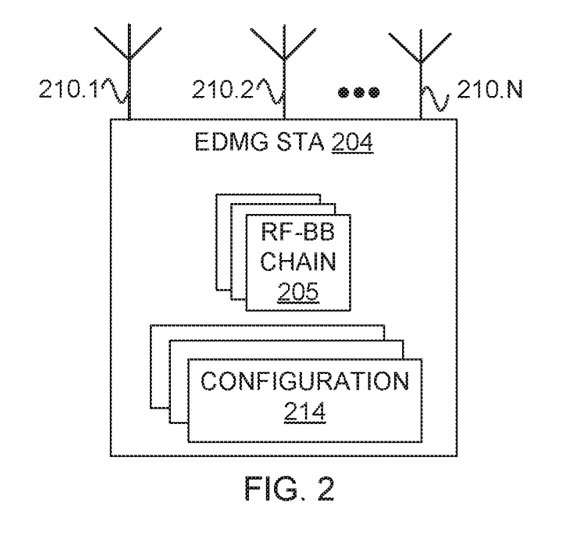
FIG. 2 illustrates an enhanced DMG (EDMG) STA in accordance with some embodiments.
Figure 3:
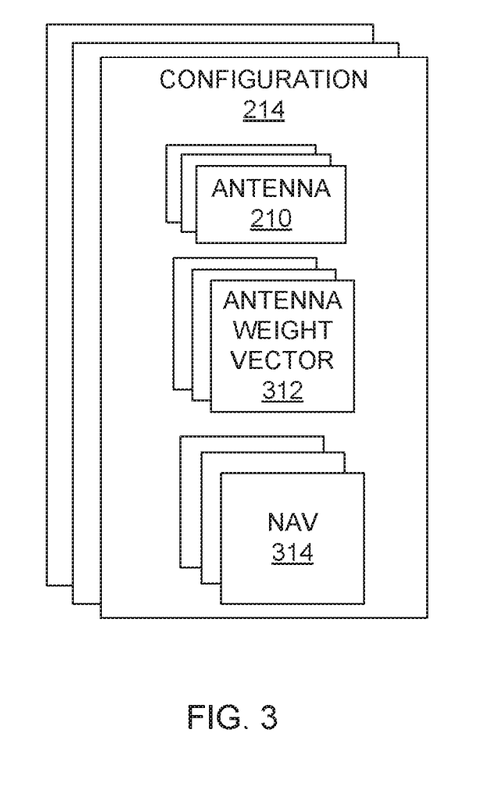
FIG. 3 illustrates configurations in accordance with some embodiments.

FIGS. 2 and 3 are disclosed in conjunction with one another. FIG. 2 illustrates an enhanced DMG (EDMG) STA 204 in accordance with some embodiments. The EDMG STA 204 may include antennas 210, RF-BB chains 205, and configuration 214. FIG. 3 illustrates configurations 214 in accordance with some embodiments. The configurations 214 include antennas 210, antenna weight vectors (AWVs) 312, and network allocation vectors (NAVs) 314. The antennas 210.1 through 210.N may be DMG antennas. The antennas 210 may be configured to perform beamforming in accordance with an antenna weight vector 312. The RE-BB chains 205 may enable the EDMG STA 204 to perform a clear channel assessment (CCA) on more than one antenna 210 simultaneously. The RF-BB chains 205 may enable the EDMG STA 204 to receive and/or transmit frames simultaneously on different antennas 210.

The EDMG STA 204 may maintain one or more NAVs 314 for one or more antennas 210 with associated AWV 312. The EDMG STA 204 may maintain one or more configurations 214 and perform CCA simultaneously for each configuration 214. The number of configurations 214 may be limited by a number of RF-BB chains 205. Each configuration 214 may include one or more NAVs 314. The EDMG STA 204 may determine configurations 214 based on current communication conditions. The EDMG STA 204 may determine configurations 214 based on one or more communication protocols such as IEEE 802.11ay.

The EDMG STA 204 may be configured to determine whether the EDMG STA 204 may transmit a packet based on the configurations 214. The EDMG STA 204 may check virtual carrier sensing, e.g. the one or more NAVs 314, and the physical carrier sensing, e.g. perform CCA with the antennas 214 indicated in the configuration 214. The EDMG STA 204 may be configured to determine which configuration 214 to consider before transmitting a packet. The EDMG STA 204 may determine that a configuration 214 is to be considered if an antenna 210 of the EDMG STA 204 is to be used to transmit the packet and the antenna 210 is part of a configuration 214.

The EDMG STA 204 may determine which configurations 214 need to be considered and idle before a packet can be transmitted. The EDMG STA 204 may perform CCA simultaneously for each of the configurations 214 that need to be considered. The CCA may be performed for one antenna 210 or more than one antenna 210. The CCA may be performed with quasi-omni receive or directional receive (e.g., using the AWV 312). Each CCA may detect and decode frames.

The EDMG STA 204 may be termed as contending for the channel. The EDMG STA 204 may be configured to decrease a backoff timer if for each applicable configuration 214, the physical CCA based on the one or more antennas 210 and AWV 312 indicate idle, and, for each applicable configuration 214, the one or more NAVs 314 indicate zero. The EDMG STA 204 may then access the channel (e.g., transmit a packet) if the backoff goes to zero. The backoff may be set from zero to a maximum value of a contention window size. The backoff window size may be dependent on the type of packet that is to be transmitted. For example, the EDMG STA 204 may use Enhanced Distributed Channel Access (EDCA) to access the channel. EDCA may categorize packets, e.g. into different access classes (ACs.) Each AC has a set of parameters for accessing the channel. In some embodiments, EDCA includes four ACs, e.g. background, best effort, video, and voice with voice receiving the highest priority.

Figure 4:
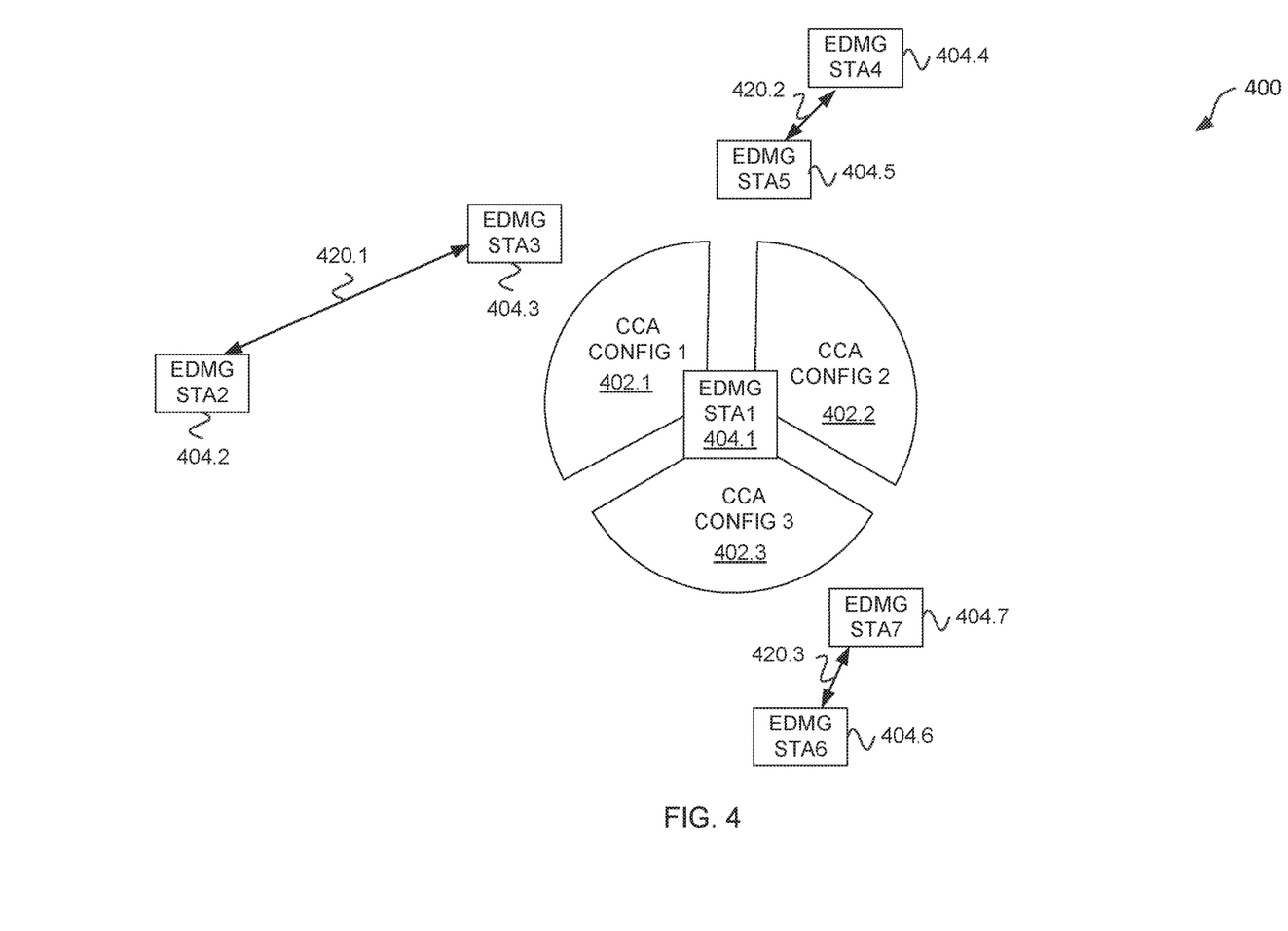
FIGS. 4 and 5 illustrate an example of network allocation vector (NAV) operations to reduce channel access delay in accordance with some embodiments.
Figure 5:
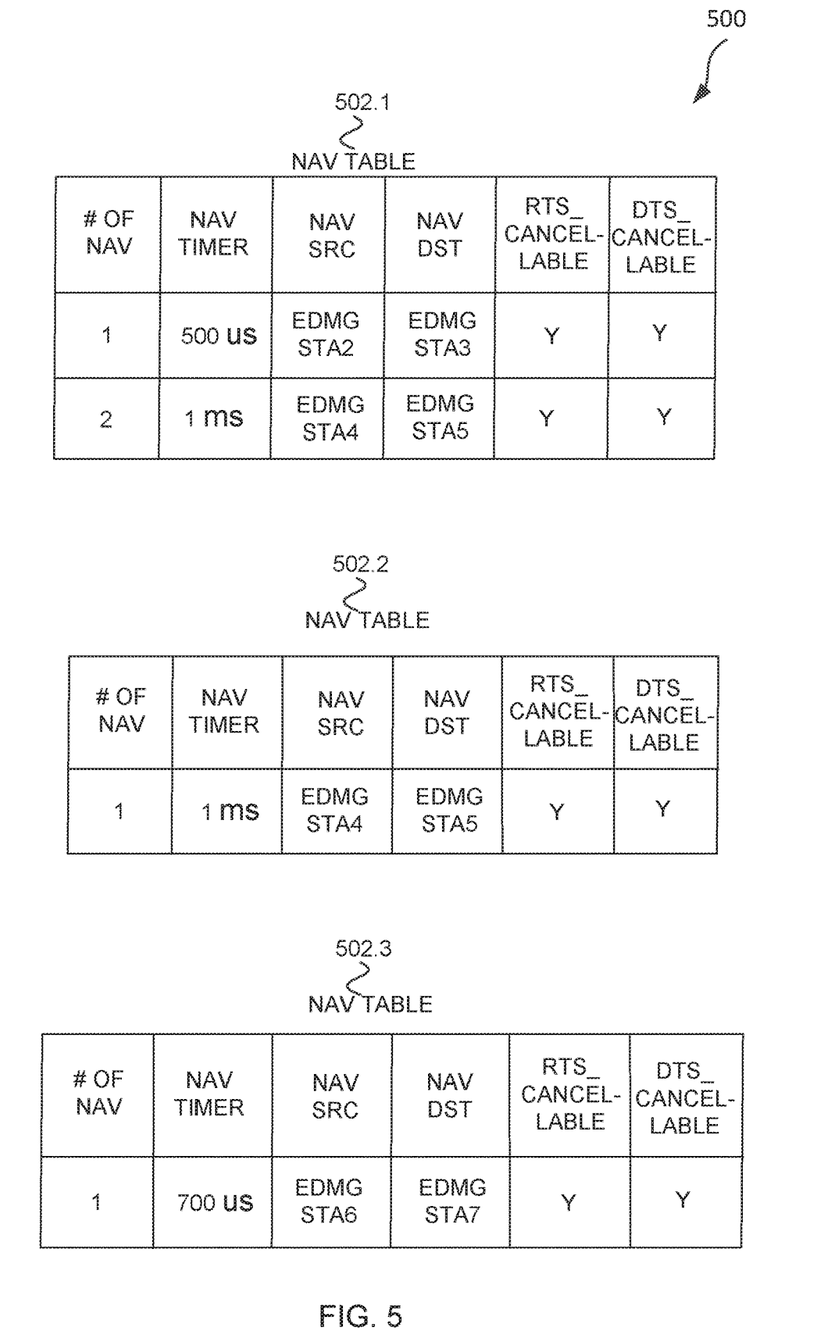

FIGS. 4 and 5 illustrate an example of network allocation vector (NAV) operations to reduce channel access delay in accordance with some embodiments. Illustrated in FIG. 4 is EDMG STAs 404, communications 420, and CCA configurations 402. EDMG STAs 404 may be EDMG STA 204. EDMG STA1 404.1 is capable of performing three CCAs simultaneously. For example, EDMG STA1 404.1 may include at least three RF-BB chains 205. CCA configurations 402 may be configurations 214. Each CCA configuration 402 includes one antenna 210. Each antenna 210 may be configured for quasi-omni receive setting for performing CCA. Communications 420 indicate communications between the two connected EDMG STAs 404, e.g., communications 420.1 may indicate communications between EDMG STA2 404.2 and EDMG STA3 404.3.

Illustrated in FIG. 5 are NAV tables for configurations 502 in accordance with some embodiments. The NAV tables for configurations 502 are NAV tables for each of the CCA configurations 402.

CCA configuration 1 402.1 includes one antenna 210 where the antenna 210 is configured for quasi-omni receive setting for performing CCA. CCA configuration 402.1 has NAV table 502.1. There are two NAVs in NAV table 502.1, NAV 1 and NAV 2. CCA configuration 2 402.2 includes one antenna 210 where the antenna 210 is configured for quasi-omni receive setting for performing CCA. CCA configuration 402.2 has NAV table 502.2. There is one NAV in NAV table 502.2. CCA configuration 3 402.3 includes one antenna 210 where the antenna 210 is configured for quasi-omni receive setting for performing CCA. CCA configuration 402.3 has NAV table 502.3. There is one NAV in NAV table 502.3.

EDMG STA1 404.1 receives frames between EDMG STA2 404.2 and EDMG STA3 404.3 performing CCA using CCA configuration 1 402.1, and creates an entry for NAV 1 in CCA configuration 1 402.1. The values for NAV 1 may be NAV timer of "500 us", NAV source (SRC) "EDMG STA2 404.2", NAV destination (DST) EDMG "STA3 404.3", request-to-send (RTS) cancellable equal to "Yes (Y)", and DMG denial to send (DTS) cancellable "Y". The RTS cancellable indicates whether the RTS can be cancelled. The DTS cancellable indicates whether the DTS is cancellable.

EDMG STA1 404.1 receives frames between EDMG STA4 404.2 and EDMG STA5 404.5 performing CCA using CCA configuration 1 402.1, and creates an entry for NAV 2 in CCA configuration 1 402.1. The values for NAV 2 are NAV timer of "1 ms", NAV SRC "EDMG STA4" 404.4, NAV DST "EDMG STA5" 404.5, RTS cancellable equal to "Y", and DTS cancellable "Y".

EDMG STA1 404.1 receives frames between EDMG STA4 404.2 and EDMG STA5 404.5 performing CCA using CCA configuration 2 402.2, and creates an entry for NAV 2 in CCA configuration 2 402.2. The values for NAV 1 are NAV timer of "1 ms", NAV SRC "EDMG STA4" 404.4, NAV DST "EDMG STA5" 404.5, RTS cancellable equal to "Y", and DTS cancellable "Y".

EDMG STA1 404.1 receives frames between EDMG STA6 404.6 and EDMG STA7 404.7 performing CCA using CCA configuration 2 402.3, and creates an entry for NAV 1 in CCA configuration 3 402.3. The values for NAV 1 are NAV timer of "700 ms", NAV SRC "EDMG STA6" 404.6, NAV DST "EDMG STA7" 404.7, RTS cancellable equal to "Y", and DTS cancellable "Y".

For EDMG STA1 404.1 to access the channel using the DMG antenna 210 of CCA configuration 1 402.1, CCA configuration 1 402.1 has to indicate the channel is idle and NAV 1 and NAV 2 of CCA configuration 402.1 have to be zero or indicate clear. NAV 1 and NAV 2 having to be zero means the EDMG STA1 404.1 has to wait for the communications 420.1 between EDMG STA2 404.2 and EDMG STA3 404.3 to end, and wait for the communications 420.2 between EDMG STA4 404.4 and EDMG STA5 404.5 to end. For accessing the channel using the antenna 210 of configuration 402.1, EDMG STA1 404.1 determines that CCA configuration 2 402.2 and CCA configuration 3 402.3 do not have to be considered before accessing the channel. EDMG STA1 404.1 may then access the channel without waiting for NAV 1 of NAV table 502.3 to be zero to access the channel, which may represent the communications 420.3 between EDMG STA7 404.7 and EDMG STA6 404.6.

If a CCA configuration 402 indicates that the physical channel is not idle, then the EDMG STA1 404.1 may be configured to attempt to decode a packet and update the corresponding NAVs of the CCA configuration 402. For example, if EDMG STA1 404.1 determines that the physical channel is busy using CCA configuration 1 402.1, the EDMG STA1 404.1 will attempt to decode a packet, and if the packet is decoded successfully the EDMG STA1 404.1 will update NAV 1 and NAV 2 of CCA configuration 402.1, in accordance with updating NAV operations. For example, the packet may be from EDMG STA2 404.2 to EDMG STA3 404.3 and may indicate a time greater than 500 μs (e.g., 1 ms) so that NAV 1 would be updated from 500 μs to 1 ms.

If EDMG STA1 404.1 needs to access the channel using the antenna 210 of CCA configuration 3 402.3, then it requires CCA to indicate idle when it is performed using CCA configuration 3 402.3, e.g. with the antenna of CCA configuration 3 402.3. Additionally, NAV 1 of CCA configuration 3 402.3 needs to indicate zero. The EDMG STA1 404.1 may determine that CCA configuration 1 402.1 and CCA configuration 2 402.2 do not need to be considered when accessing the channel with the antenna of CCA configuration 3 402.3.

If EDMG STA1 404.1 needs to access the channel using the antenna 210 of CCA configuration 2 402.2, then it requires CCA to indicate idle when it is performed using CCA configuration 2 402.2, e.g. with the antenna of CCA configuration 2 402.2. Additionally, NAV 1 of CCA configuration 2 402.2 needs to indicate zero. The EDMG STA1 404.1 may determine that CCA configuration 1 402.1 and CCA configuration 3 402.3 do not need to be considered when accessing the channel with the antenna of CCA configuration 2 402.2.

In some embodiments, the EDMG STA1 404.1 is configured to determine which CCA configurations 402 to consider based on which antennas 210 are to be used to access the channel. For example, if one antenna 210 is to be used to access the channel the EDMG STA1 404.1 may determine that a CCA configuration 402 needs to be considered if the CCA configuration 402 includes the antenna 210 that is to be used for accessing the channel.

In some embodiments, the EDMG STA1 404.1 may access the channel without considering some CCA configurations 402, which includes the physical CCA results and the NAVs observations, which may reduce the time to access the channel. In some embodiments, one or more of EDMG STAs 404 (except EDMG STA1 404.1) may be legacy devices 106.

Figure 6:
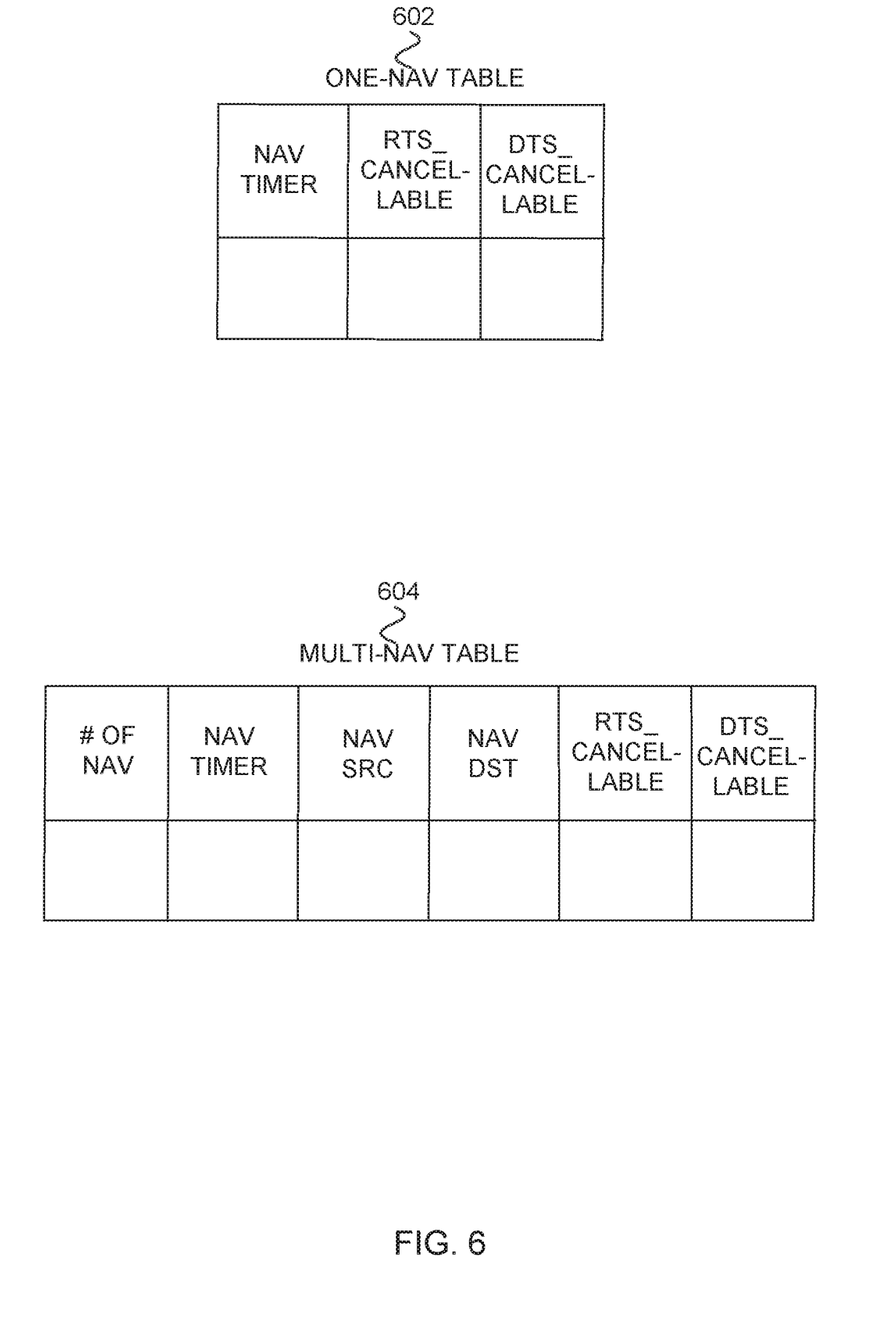
FIG. 6 illustrates one-NAV table and multi-NAV table in accordance with some embodiments.
Figure 7:
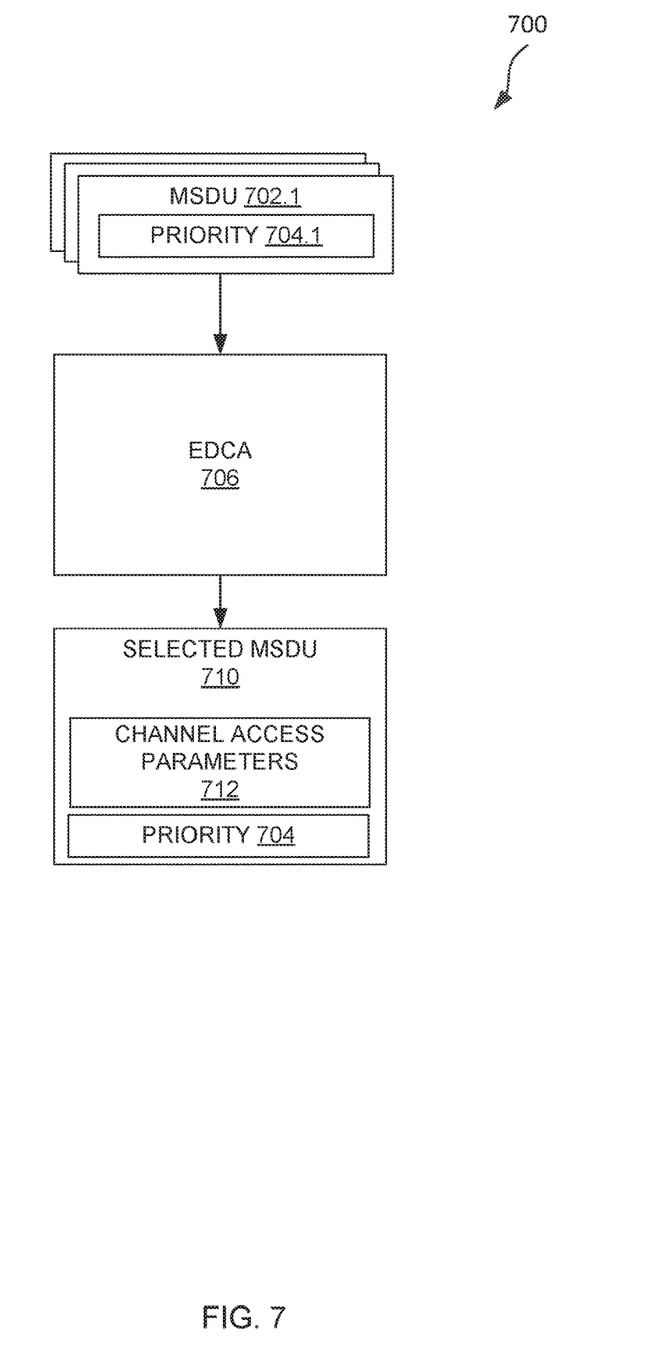
FIG. 7 illustrates an enhanced distributed channel access (EDCA) system in accordance with some embodiments.

FIG. 6 illustrates one-NAV table 602 and multi-NAV table 604 in accordance with some embodiments. Illustrated in FIG. 7 is one-NAV table 610 and multi-NAV table 620. The one-NAV table 602.1 includes a NAV timer, an RTS cancellable, and a DTS cancellable. The NAV timer indicates how long the EDMG STA 404 should wait before accessing the channel due to the NAV. The RTS_cancellable indicates whether the RTS may be cancelled. The DTS_cancellable indicates whether a DTS is cancellable. The multi-NAV table 604 includes a row for each NAV with a number of the NAV that the row applies to, a NAV timer, a NAV SRC, a NAV DST, an RTS_cancellable, and a DTS cancellable.

In some embodiments, the one-NAV table 602 and/or multi-NAV table 604 may exclude some of the illustrated information or may include additional information.

FIG. 7 illustrates an enhanced distributed channel access (EDCA) system 700 in accordance with some embodiments. The EDCA 700 includes media access control (MAC) service data units (MSDUs) 702 with a priority 704. The MSDUs 702 may be packets from a MAC layer of the EDMG STA 404. The priority 704 may be an explicit priority of a packet type that indicates a priority.

The EDCA 706 may take the MSDUs 702 and priorities 704 and select a MSDU as the selected MSDU 710 to be transmitted next. The selected MSDU 710 may include channel access parameters 712 and a priority 704. The channel access parameters 712 may include an arbitration inter-frame space (AIFS) and a contention window size for selecting a random backoff.

The priority 704 may be termed an access class in accordance with some embodiments. Examples of priority are background, best effort, video, and voice. In some embodiments, there may be eight different priorities.

In some embodiments, each configuration 214 is associated with a separate or shared EDCA 706. For example, in some embodiments, CCA configurations 402.1, 402.2, and 402.3 may have their own separate EDCA 706. In some embodiments, there is one EDCA 706 that is shared by CCA configurations 402. In some embodiments, there are multiple EDCAs 706 that are may be shared by two or more CCA configurations 402.

Figure 8:
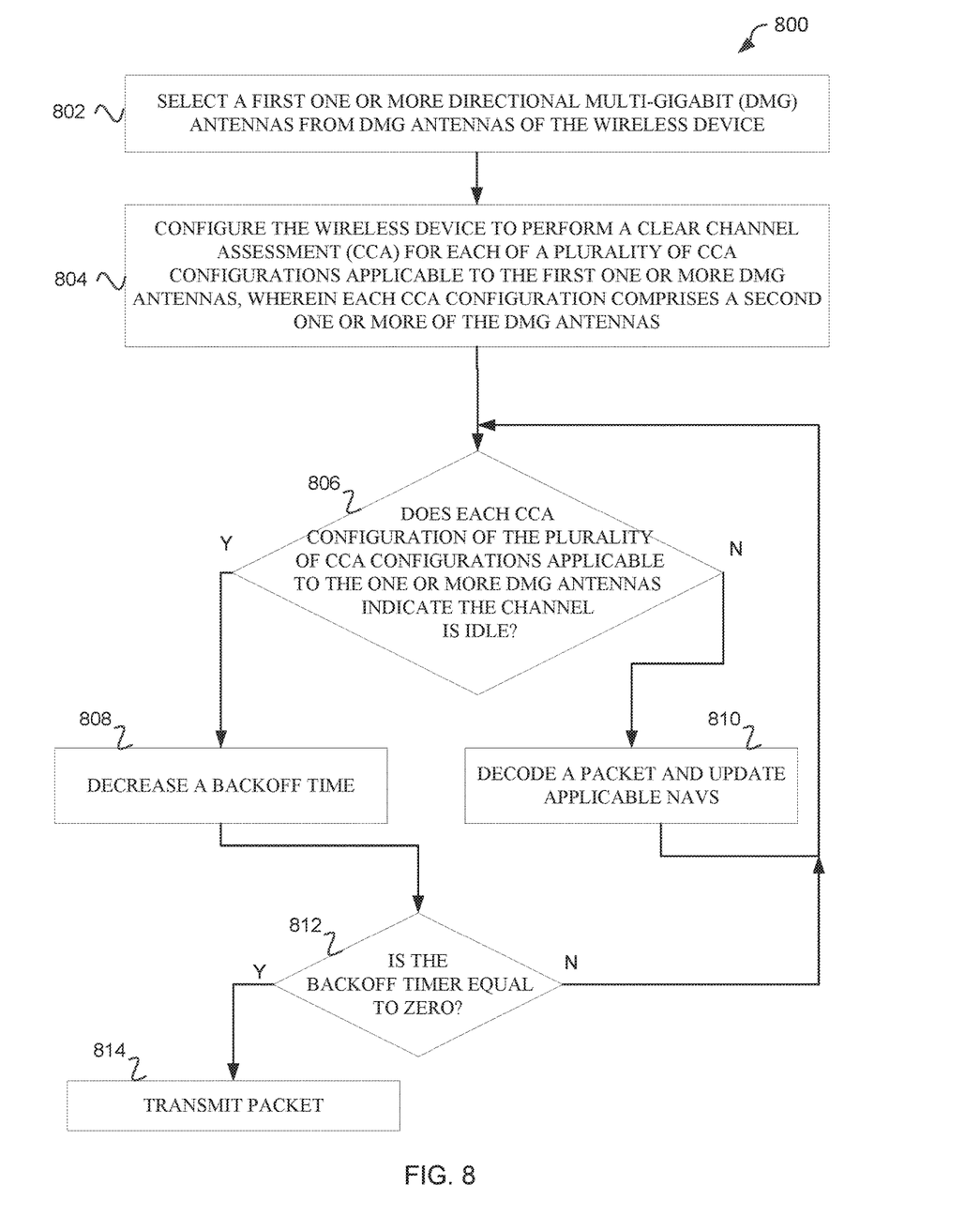
FIG. 8 illustrates a method for NAV operations to reduce channel access delay in accordance with some embodiments.

FIG. 8 illustrates a method for NAV operations to reduce channel access delay 800 in accordance with some embodiments. The method 800 begins at operation 802 with selecting a first one or more directional multi-gigabit (DM) antennas from DMG antennas of the wireless device. For example, EDMG 404.1 may select a first antenna to transmit a packet on a channel.

The method 800 continues at operation 804 with configuring the wireless device to perform a clear channel assessment (CCA) for each of a plurality of CCA configurations applicable to the first one or more DMG antennas, wherein each CCA configuration comprises a second one or more of the DMG antennas.

For example, EDMG 404.1 may perform the CCAs for CCA configuration 1 402.1 and CCA configuration 2 402.2 to transmit using a first antenna on a channel as disclosed in conjunction with FIG. 4. In some embodiments, EDMG 404.1 may perform the CCAs simultaneously or concurrently.

The method 800 continues at operation 806 with does each CCA configuration of the plurality of CCA configurations applicable to the one or more DMG antennas indicate the channel is idle (which includes both the physical CCA being clear and the corresponding NAVs being clear)? For example, continuing the example of FIG. 4, CCA configuration 1 402.1 and CCA configuration 2 402.2 both indicate that the virtual carrier sense (NAV s) is not idle. If the NAVs of CCA configuration 1 402.1 and CCA configuration 2 402.2 were all zero and the physical carrier sense using CCA configuration 1 402.1 and CCA configuration 2 402.2 indicated idle for a predetermine period of time (e.g., arbitration inter-frame space (AIFS) or distributed coordination function inter-frame space (DIFS)), then operation 806 would result in a yes.

If operation 806 results in a yes, then the method 800 continues at operation 808 with decreasing a backoff time. The method 800 continues at operation 812 with if the backoff time is zero, configure the wireless device to transmit the packet using the first one or more DMG antennas. For example, an apparatus of DMG 404.1 may configure DMG 404.1 to transmit a packet with the first antenna on a channel. If operation 812 results in no, then the method 800 may return to operation 806.

If operation 806 results in a no, then the method 800, optionally, continues at operation 810 with decoding a packet and updating applicable NAVs.

For example, the packet may be from EDMG STA2 404.2 to EDMG STA3 404.3 and may indicate a time greater than 500 μs (e.g., 1 ms) so that NAV 1 (NAV table 502.1) would be updated from 500 μs to 1 ins. In some embodiments, after operation 806, the method continues with waiting a predetermined period of time. For example, DMG 404.1 may wait a time period indicated in the NAV timers. The DMG 404.1 may wait a period of time while the CCAs continue to indicate idle (e.g., an arbitration inter-frame space (AIFS) or DIFS). The method 800 may continue by returning to operation 806.

Figure 9:
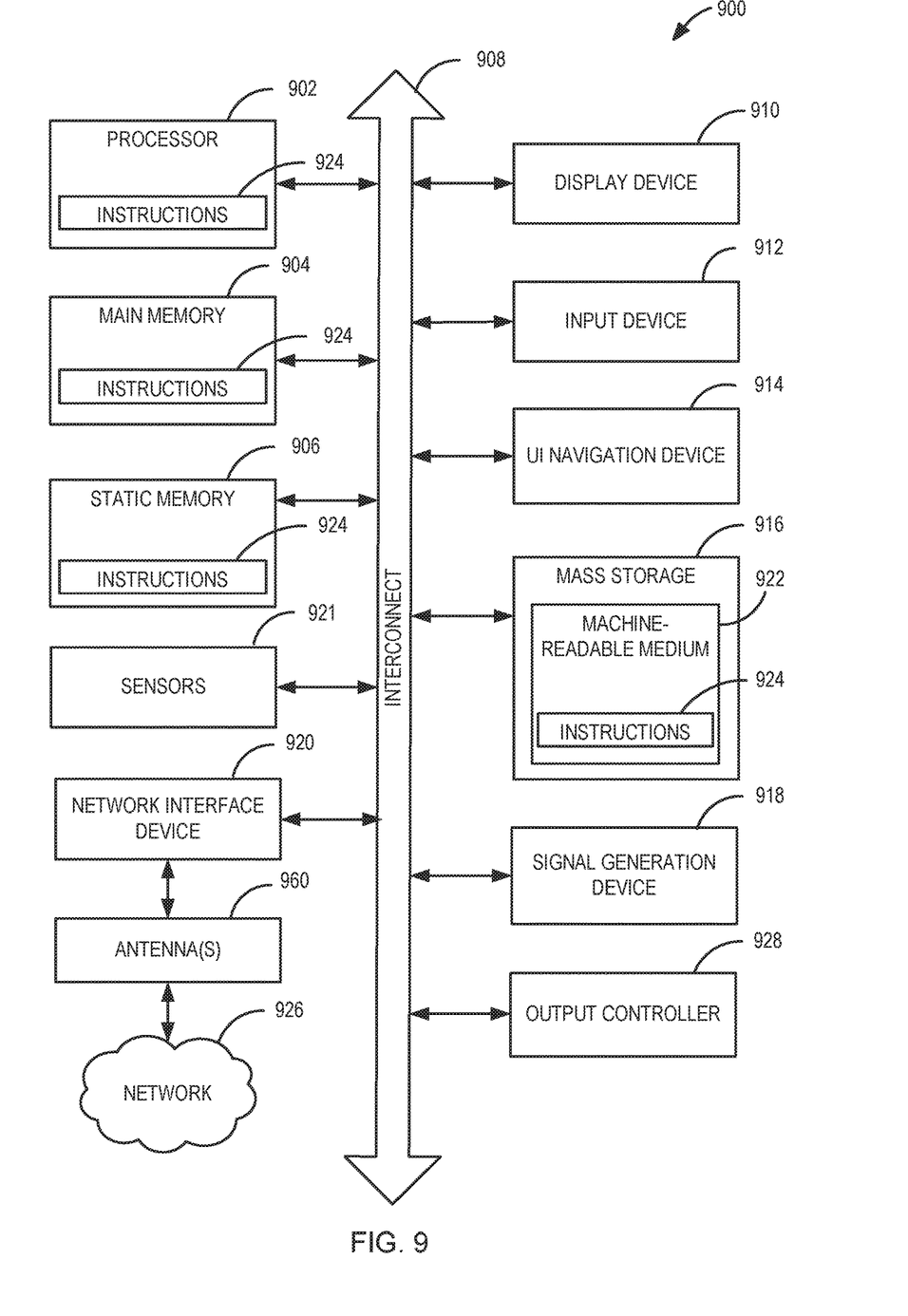
FIG. 9 illustrates a block diagram of an example machine upon which any one or more of the techniques (e.g., methodologies) discussed herein may perform.

FIG. 9 illustrates a block diagram of an example machine 900 upon which any one or more of the techniques (e.g., methodologies) discussed herein may perform. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a master station 102, HE station 104, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908.

Specific examples of main memory 904 include Random Access Memory (RAM), and semiconductor memory devices, which may include, in some embodiments, storage locations in semiconductors such as registers. Specific examples of static memory 906 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 900 may further include a display device 910, an input device 912 (e.g., a keyboard), and a user interface (UI) navigation device 914 (e.g., a mouse). In an example, the display device 910, input device 912 and UI navigation device 914 may be a touch screen display. The machine 900 may additionally include a mass storage (e.g., drive unit) 916, a signal generation device 918 (e.g., a speaker), a network interface device 920, and one or more sensors 921, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 902 and/or instructions 924 may comprise processing circuitry and/or transceiver circuitry.

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 may constitute machine readable media.

Specific examples of machine readable media may include: non-volatile memory, such as semiconductor memory devices (e.g. EPROM or EEPROM) and flash memory devices; magnetic disks, such as internal hard disks and removable disks; magneto-optical disks; RAM; and CD-ROM and DVD-ROM disks.

While the machine readable medium 922 is illustrated as a single medium, the term "machine readable medium" may include a single medium or multiple media (e.g., a centralized or distributed database, and/or associated caches and servers) configured to store the one or more instructions 924.

An apparatus of the machine 900 may be one or more of a hardware processor 902 (e.g., a central processing unit (CPU), a graphics processing unit (GPU), a hardware processor core, or any combination thereof), a main memory 904 and a static memory 906, sensors 921, network interface device 920, antennas 960, a display device 910, an input device 912, a UI navigation device 914, a mass storage 916, instructions 924, a signal generation device 918, and an output controller 928. The apparatus may be configured to perform one or more of the methods and/or operations disclosed herein. The apparatus may be intended as a component of the machine 900 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 920 may include one or more physical jacks (e.g., Ethernet, coaxial, or phone jacks) or one or more antennas to connect to the communications network 926. In an example, the network interface device 920 may include one or more antennas 960 to wirelessly communicate using at least one of single-input multiple-output (SIMO), multiple-input multiple-output (MIMO), or multiple-input single-output (MISO) techniques. In some examples, the network interface device 920 may wirelessly communicate using Multiple User MIMO techniques. The term "transmission medium" shall be taken to include any intangible medium that is capable of storing, encoding or carrying instructions for execution by the machine 900, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Various embodiments of the invention may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Example 1 is an apparatus of a wireless device, the apparatus including memory; and processing circuitry coupled to the memory, the processing circuitry configured to: select a first one or more directional multi-gigabit (DMG) antennas from DMG antennas of the wireless device; configure the wireless device to perform a clear channel assessment (CCA) for each of a plurality of CCA configurations applicable to the first one or more DMG antennas, where each CCA configuration comprises a second one or more of the DMG antennas; and if each CCA configuration applicable to the first one or more DMG antennas indicate the channel is idle, decrease a backoff time, and, if the backoff time is zero, configure the wireless device to transmit a packet on the channel using the first one or more DMG antennas.

In Example 2, the subject matter of Example 1 optionally includes where the wireless device is configured to perform the CCA concurrently for each of the plurality of CCA configurations applicable to the first one or more DMG antennas, and where the processing circuitry is further configured to: if one of the CCA configurations applicable to the first one or more DMG antennas indicates busy, refrain from decreasing the backoff time.

In Example 3, the subject matter of any one or more of Examples 1-2 optionally include where the processing circuitry is further configured to: determine that a CCA configuration of the plurality of CCA configurations is applicable to the first one or more DMG antennas if at least one of the first one or more DMG antennas is a same DMG antenna as a DMG antenna of the second one or more of the DMG antennas of the CCA configuration.

In Example 4, the subject matter of any one or more of Examples 1-3 optionally include where the CCA is to be performed in accordance with quasi-omni receive or directional receive.

In Example 5, the subject matter of any one or more of Examples 1-4 optionally include where the processing circuitry is further configured to: configure the wireless device to perform the CCA concurrently for each of the plurality of CCA configurations applicable to the first one or more DMG antennas in accordance with an antenna weight vector (AWV) associated with each of the second one or more of the plurality of DMG antennas.

In Example 6, the subject matter of any one or more of Examples 1-5 optionally include where each CCA configuration comprises one or more network allocation vectors (NAVs).

In Example 7, the subject matter of Example 6 optionally includes where the processing circuitry is further configured to: determine that a CCA configuration indicates the channel is idle, if each NAV of the one or more NAVs of the CCA configuration indicate idle and if the performance of the CCA for the CCA configuration indicates the channel is idle for a predetermined period of time.

In Example 8, the subject matter of Example 7 optionally includes where the processing circuitry is further configured to: if the performance of the CCA indicates the channel is busy, decode a frame and update the one or more NAVs of the CCA configuration.

In Example 9, the subject matter of any one or more of Examples 1-8 optionally include where the processing circuitry is further configured to: configure the wireless device to perform the CCA simultaneously for each of the plurality of CCA configurations applicable to the first one or more DMG antennas, where each CCA is to be performed with a separate radio-frequency base band (RF-BB) chain.

In Example 10, the subject matter of any one or more of Examples 1-9 optionally include where the processing circuitry is further configured to: if the backoff time is not zero, configure the wireless device to continue to perform the CCA simultaneously for each of the plurality of CCA configurations applicable to the first one or more DMG antennas, and if each CCA configuration applicable to the one or more DMG antennas indicate the channel is idle, decrease the backoff time, and, if the backoff time is zero, configure the wireless device to transmit the packet using the first one or more DMG antennas.

In Example 11, the subject matter of any one or more of Examples 1-10 optionally include where the processing circuitry is further configured to: configure the wireless device to store for each of a plurality of CCA configurations one or more network allocation vectors (NAVs), a NAV timer for each of the one or more NAVs, and one or more of the following group: a NAV source field, a NAV destination field, a request-to-send cancellable field, and a DTS cancellable field.

In Example 12, the subject matter of any one or more of Examples 1-11 optionally include where the wireless device and the one or more stations are each one from the following group: an Institute of Electrical and Electronic Engineers (IEEE) 802.11ax access point, an IEEE 802.11ax station, an IEEE 802.11ay station, an IEEE 802.11ay access point, an IEEE 802.11ad station, an IEEE 802.11ad access point, an IEEE 802.11 station, and an IEEE 802.11 access point.

In Example 13, the subject matter of any one or more of Examples 1-12 optionally include transceiver circuitry coupled to the processing circuitry.

In Example 14, the subject matter of Example 13 optionally includes one or more antennas coupled to the transceiver circuitry.

Example 15 is a non-transitory computer-readable storage medium that stores instructions for execution by one or more processors, the instructions to configure the one or more processors to cause an apparatus of a wireless device to: select a first one or more directional multi-gigabit (DMG) antennas from DMG antennas of the wireless device; configure the wireless device to perform a clear channel assessment (CCA) for each of a plurality of CCA configurations applicable to the first one or more DMG antennas, where each CCA configuration comprises a second one or more of the DMG antennas; and if each CCA configuration applicable to the first one or more DMG antennas indicate the channel is idle, decrease a backoff time, and, if the backoff time is zero, configure the wireless device to transmit a packet on the channel using the first one or more DMG antennas.

In Example 16, the subject matter of Example 15 optionally includes the instructions to further configure the one or more processors to cause the apparatus to: if one of the CCA configurations applicable to the first one or more DMG antennas indicates busy, refrain from decreasing the backoff time, where the wireless device is configured to perform the CCA concurrently for each of the of CCA configurations applicable to the first one or more DMG antennas.

In Example 17, the subject matter of any one or more of Examples 15-16 optionally include the instructions to further configure the one or more processors to cause the apparatus to: determine that a CCA configuration of the plurality of CCA configurations is applicable to the first one or more DMG antennas if at least one of the first one or more DMG antennas is a same DMG antenna as a DMG antenna of the second one or more of the DMG antennas of the CCA configuration.

In Example 18, the subject matter of any one or more of Examples 15-17 optionally include where the CCA is to be performed in accordance with quasi-omni receive or directional receive.

In Example 19, the subject matter of any one or more of Examples 15-18 optionally include the instructions to further configure the one or more processors to cause the apparatus to: configure the wireless device to perform the CCA concurrently for each of the plurality of CCA configurations applicable to the first one or more DMG antennas in accordance with an antenna weight vector (AWV) associated with each of the second one or more of the plurality of DMG antennas.

Example 20 is a method performed by an apparatus of a wireless device, the method including: selecting a first one or more directional multi-gigabit (DMG) antennas from DMG antennas of the wireless device; configuring the wireless device to perform a clear channel assessment (CCA) for each of a plurality of CCA configurations applicable to the first one or more DMG antennas, where each CCA configuration comprises a second one or more of the DMG antennas; and if each CCA configuration applicable to the first one or more DMG antennas indicate the channel is idle, decreasing a backoff time, and, if the backoff time is zero, configuring the wireless device to transmit a packet on the channel using the first one or more DMG antennas.

In Example 21, the subject matter of Example undefined optionally includes refraining from decreasing the backoff time, if one of the CCA configurations applicable to the first one or more DMG antennas indicates busy, wherein the wireless device is configured to perform the CCA concurrently for each of the plurality of CCA configurations applicable to the first one or more DMG antennas.

Example 22 is an apparatus of a wireless device, the apparatus including: means for selecting a first one or more directional multi-gigabit (DMG) antennas from DMG antennas of the wireless device; means for configuring the wireless device to perform a clear channel assessment (CCA) for each of a plurality of CCA configurations applicable to the first one or more DMG antennas, where each CCA configuration comprises a second one or more of the DMG antennas; and if each CCA configuration applicable to the first one or more DMG antennas indicate the channel is idle, means for decreasing a backoff time, and, if the backoff time is zero, means for configuring the wireless device to transmit a packet on the channel using the first one or more DMG antennas.

In Example 23, the subject matter of Example 22 optionally includes the apparatus further including: means for performing the CCA concurrently for each of the plurality of CCA configurations applicable to the first one or more DMG antennas; and if one of the CCA configurations applicable to the first one or more DMG antennas indicates busy, means for refraining from decreasing the backoff time.

In Example 24, the subject matter of any one or more of Examples 22-23 optionally include the apparatus further including: means for determining that a CCA configuration of the plurality of CCA configurations is applicable to the first one or more DMG antennas if at least one of the first one or more DMG antennas is a same DMG antenna as a DMG antenna of the second one or more of the DMG antennas of the CCA configuration.

In Example 25, the subject matter of any one or more of Examples 22-24 optionally include where the CCA is to be performed in accordance with quasi-omni receive or directional receive.

In Example 26, the subject matter of any one or more of Examples 22-25 optionally include the apparatus further including: means for configuring the wireless device to perform the CCA concurrently for each of the plurality of CCA configurations applicable to the first one or more DMG antennas in accordance with an antenna weight vector (AWV) associated with each of the second one or more of the plurality of DMG antennas.

In Example 27, the subject matter of any one or more of Examples 22-26 optionally include where each CCA configuration comprises one or more network allocation vectors (NAVs).

In Example 28, the subject matter of Example 27 optionally includes the apparatus further including: means for determining that a CCA configuration indicates the channel is idle, if each NAV of the one or more NAVs of the CCA configuration indicate idle and if the performance of the CCA for the CCA configuration indicates the channel is idle for a predetermined period of time.

In Example 29, the subject matter of Example 28 optionally includes the apparatus further including: if the performance of the CCA indicates the channel is busy, means for decoding a frame and update the one or more NAVs of the CCA configuration.

In Example 30, the subject matter of any one or more of Examples 22-29 optionally include the apparatus further including: means for configuring the wireless device to perform the CCA simultaneously for each of the plurality of CCA configurations applicable to the first one or more DMG antennas, where each CCA is to be performed with a separate radio-frequency base band (RF-BB) chain.

In Example 31, the subject matter of any one or more of Examples 22-30 optionally include the apparatus further including: if the backoff time is not zero, means for configuring the wireless device to continue to perform the CCA simultaneously for each of the plurality of CCA configurations applicable to the first one or more DMG antennas, and if each CCA configuration applicable to the one or more DMG antennas indicate the channel is idle, means for decreasing the backoff time, and, if the backoff time is zero, means for configuring the wireless device to transmit the packet using the first one or more DMG antennas.

In Example 32, the subject matter of any one or more of Examples 22-31 optionally include the apparatus further including: means for configuring the wireless device to store for each of a plurality of CCA configurations one or more network allocation vectors (NAV)s, a NAV timer for each of the one or more NAVs, and one or more of the following group: a NAV source field, a NAV destination field, a request-to-send cancellable field, and a DTS cancellable field.

In Example 33, the subject matter of any one or more of Examples 22-32 optionally include where the wireless device and the one or more stations are each one from the following group: an Institute of Electrical and Electronic Engineers (IEEE) 802.11ax access point, an IEEE 802.11ax station, an IEEE 802.11ay station, an IEEE 802.11ay access point, an IEEE 802.11ad station, an IEEE 802.11ad access point, an IEEE 802.11 station, and an IEEE 802.11 access point.

In Example 34, the subject matter of any one or more of Examples 22-33 optionally include means for processing radio signals.

In Example 35, the subject matter of Example 34 optionally includes means for receiving and transmitting radio signals.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a wireless device, the apparatus comprising memory; and processing circuitry coupled to the memory, the processing circuity configured to:
select a first one or more directional multi-gigabit (DMG) antennas from DMG antennas of the wireless device;
configure the wireless device to perform a clear channel assessment (CCA) concurrently for each of a plurality of CCA configurations applicable to the first one or more DMG antennas wherein each CCA configuration comprises a second one or more of the DMG antennas, and wherein the CCA is performed in accordance with an antenna weight vector (AWV) associated with the second one or more of the plurality of DMG antennas; and
if each CCA configuration applicable to the first one or more DMG antennas indicate the channel is idle, decrease a backoff time, and, if the backoff time is zero, configure the wireless device to transmit a packet on the channel using the first one or more DMG antennas.

2. The apparatus of claim 1, wherein the wireless device is configured to perform the CCA concurrently for each of the plurality of CCA configurations applicable to the first one or more DMG antennas, and wherein the processing circuitry is further configured to:
if one of the CCA configurations applicable to the first one or more DMG antennas indicates busy, refrain from decreasing the backoff time.

3. The apparatus of claim 1, wherein the processing circuitry is further configured to:
determine that a CCA configuration of the plurality of CCA configurations is applicable to the first one or more DMG antennas if at least one of the first one or more DMG antennas is a same DMG antenna as a DMG antenna of the second one or more of the DMG antennas of the CCA configuration.

4. The apparatus of claim 1, wherein the CCA is to be performed in accordance with quasi-omni receive or directional receive.

5. The apparatus of claim 1, wherein each CCA configuration comprises one or more network allocation vectors (NAVs).

6. The apparatus of claim 5, wherein the processing circuitry is further configured to:
determine that a CCA configuration indicates the channel is idle, if each NAV of the one or more NAVs of the CCA configuration indicate idle and if the performance of the CCA for the CCA configuration indicates the channel is idle for a predetermined period of time.

7. The apparatus of claim 6, wherein the processing circuitry is further configured to:
if the performance of the CCA indicates the channel is busy, decode a frame and update the one or more NAVs of the CCA configuration.

8. The apparatus of claim 1, wherein the processing circuitry is further configured to:
configure the wireless device to perform the CCA simultaneously for each of the plurality of CCA configurations applicable to the first one or more DMG antennas, wherein each CCA is to be performed with a separate radio-frequency base band (RF-BB) chain.

9. The apparatus of claim 1, wherein the processing circuitry is further configured to:
if the backoff time is not zero, configure the wireless device to continue to perform he CCA simultaneously for each of the plurality of CCA configurations applicable to the first one or more DMG antennas, and if each CCA configuration applicable to the one or more DMG antennas indicate the channel is idle, decrease the backoff time, and, if the backoff time is zero, configure the wireless device to transmit the packet using the first one or more DMG antennas.

10. The apparatus of claim 1, wherein the processing circuitry is further configured to:
configure the wireless device to store for each of a plurality of CCA configurations one or more network allocation vectors (NAV)s, a NAV timer for each of the one or more NAVs, and one or more of the following group: a NAV source field, a NAV destination field, a request-to-send cancellable field, and a denial to send (DTS) cancellable field.

11. The apparatus of claim 1, wherein the wireless device and the one or more stations are each one from the following group: an Institute of Electrical and Electronic Engineers (IEEE) 802.11ax access point, an IEEE 802.11ax station, an IEEE 802.11ay station, an IEEE 802.11ay access point, an IEEE 802.11ad station, an IEEE 802.11ad access point, an IEEE 802.11 station, and an IEEE 802.11 access point.

12. The apparatus of claim 1, further comprising transceiver circuitry coupled to the processing circuitry.

13. The apparatus of claim 12, further comprising one or more antennas coupled to the transceiver circuitry.

14. A non-transitory computer-readable storage medium that stores instructions for execution by one or more processors, the instructions to configure the one or more processors to cause an apparatus of a wireless device to:
select a first one or more directional multi-gigabit (DMG) antennas from DMG antennas of the wireless device;
configure the wireless device to perform a clear channel assessment (CCA) concurrently for each of a plurality of CCA configurations applicable to the first one or more DMG antennas wherein each CCA configuration comprises a second one or more of the DMG antennas, and wherein the CCA is performed in accordance with an antenna weight vector (AWV) associated with the second one or more of the plurality of DMG antennas; and
if each CCA configuration applicable to the first one or more DMG antennas indicate the channel is idle, decrease a backoff time, and, if the backoff time is zero, configure the wireless device to transmit a packet on the channel using the first one or more DMG antennas.

15. The non-transitory computer-readable storage medium of claim 14, the instructions to further configure the one or more processors to cause the apparatus to:
if one of the CCA configurations applicable to the first one or more DMG antennas indicates busy, refrain from decreasing the backoff time, wherein the wireless device is configured to perform the CCA concurrently for each of the plurality of CCA configurations applicable to the first one or more DMG antennas.

16. The non-transitory computer-readable storage medium of claim 14, the instructions to further configure the one or more processors to cause the apparatus to:
determine that a CCA configuration of the plurality of CCA configurations is applicable to the first one or more DMG antennas if at least one of the first one or more DMG antennas is a same DMG antenna as aIDMG antenna of the second one or more of the DMG antennas of the CCA configuration.

17. The non-transitory computer-readable storage medium of claim 14, wherein the CCA is to be performed in accordance with quasi-omni receive or directional receive.

18. The non-transitory computer-readable storage medium of claim 14, the instructions to further configure the one or more processors to cause the apparatus to:
configure the wireless device to perform the CCA concurrently for each of the plurality of CCA configurations applicable to the first one or more DMG antennas in accordance with an antenna weight vector (AWV) associated with each of the second one or more of the plurality of DMG antennas.

19. A method performed by an apparatus of a wireless device, the method comprising:
selecting a first one or more directional multi-gigabit (DMG) antennas from DMG antennas of the wireless device;
configuring the wireless device to perform a clear channel assessment (CCA) concurrently for each of a plurality of CCA configurations applicable to the first one or more DMG antennas wherein each CCA configuration comprises a second one or more of the DMG antennas, and wherein the CCA is performed in accordance with an antenna weight vector (AWV) associated with the second one or more of the plurality of DMG antennas; and
if each CCA configuration applicable to the first one or more DMG antennas indicate the channel is idle, decreasing a backoff time, and, if the backoff time is zero, configuring the wireless device to transmit a packet on the channel using the first one or more DMG antennas.

20. The method of claim 19, the method further comprising:
refraining from decreasing the backoff time, if one of the CCA configurations applicable to the first one or more DMG antennas indicates busy, wherein the wireless device is configured to perform the CCA concurrently for each of the plurality of CCA configurations applicable to the first one or more DMG antennas.

* * * * *